July 16, 1935.  C. H. FINK  2,008,186
INTERNAL COMBUSTION ENGINE
Filed Dec. 20, 1930  2 Sheets-Sheet 1
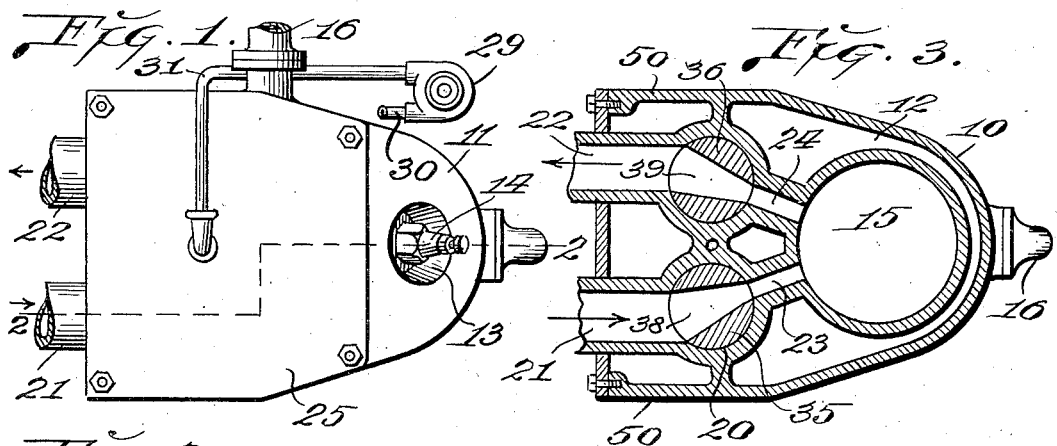
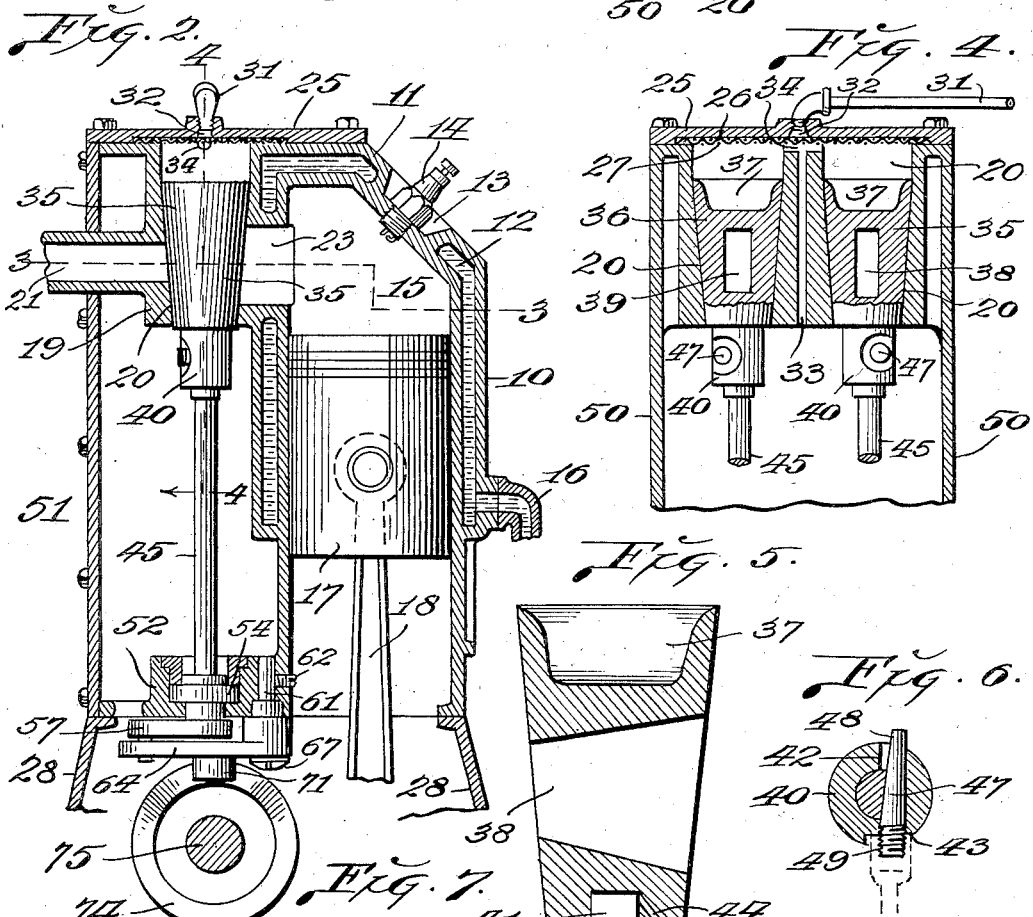
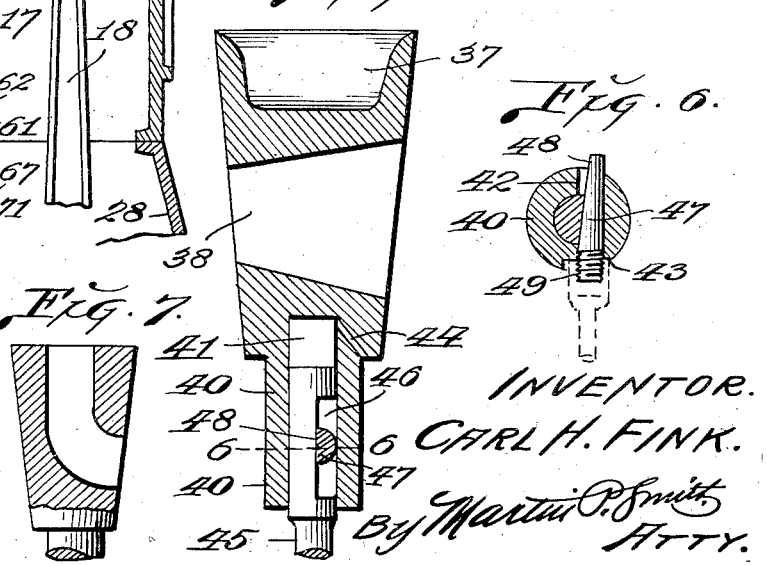

July 16, 1935.  C. H. FINK  2,008,186
INTERNAL COMBUSTION ENGINE
Filed Dec. 20, 1930  2 Sheets-Sheet 2

INVENTOR:—
CARL H. FINK.

Patented July 16, 1935

2,008,186

UNITED STATES PATENT OFFICE 2,008,186

INTERNAL COMBUSTION ENGINE

Carl H. Fink, Los Angeles, Calif.

Application December 20, 1930, Serial No. 503,630

7 Claims. (Cl. 123—190)

My invention relates to an internal combustion engine and has for its principal objects, to generally improve upon and simplify the construction of the existing forms of internal combustion engines, to provide an engine having an integral one-piece cylinder block and head, thereby greatly minimizing production costs, further, to provide oscillating valves that control the admission of gaseous fuel into the combustion chamber and the subsequent exhaust of both products of combustion from the combustion chamber and further, to provide relatively simple, practical and efficient means for lubricating the valves, dissipating the heat therefrom and at the same time producing an effective oil seal joint between the bodies of the valve and the bearings in which the same oscillate.

A further object of my invention is, to provide improved means for effecting oscillation of the valves in proper time relation to each other and to the reciprocating movements of the piston within the engine cylinder.

Further objects of my invention are, to provide an internal combustion engine wherein the oscillating valves and their operating mechanisms are readily accessible so as to facilitate installation and removal, thereby permitting ready inspection, adjustment and repairs, further, to provide simple and efficient means for adjustably securing the oscillating valves to the valve rods or stems and further, to provide an internal combustion engine that is comparatively light in weight and which may be economically employed for the propulsion of motor vehicles, air planes, motor boats or wherever high speed rotary motion and power are desired.

With the foregoing and other objects in view, my invention consists in certain novel features of construction and arrangement of parts that will hereinafter be more fully described and claimed and illustrated in the accompanying drawings in which:

Fig. 1 is a top plan view of an internal combustion engine embodying the principles of my invention.

Fig. 2 is a vertical section taken approximately on the line 2—2 of Fig. 1.

Fig. 3 is a horizontal section taken on the line 3—3 of Fig. 2.

Fig. 4 is a cross section taken on the line 4—4 of Fig. 2.

Fig. 5 is an enlarged vertical section taken through the center of one of the oscillating valves and showing the means for adjustably securing said valve to its stem.

Fig. 6 is a horizontal section taken on the line 6—6 of Fig. 5.

Fig. 7 is a vertical section of a modified form of the oscillating valve.

Figure 8:
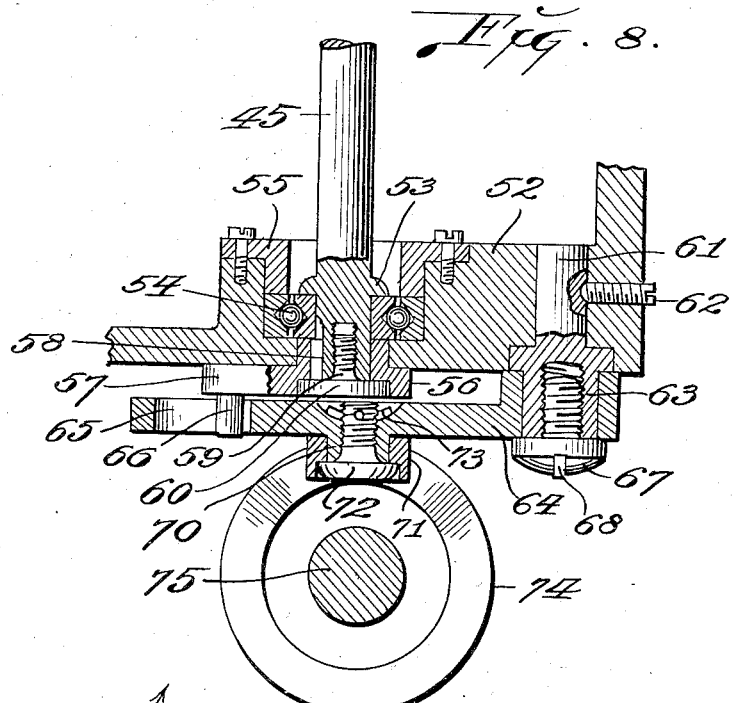
Fig. 8 is an enlarged vertical section showing the cam operated means for imparting oscillatory movement to the valves and their stems.

Referring by numerals to the accompanying drawings which illustrate a practical embodiment of my invention, 10 designates a cylinder having a head 11 that is cast integral with the body of the cylinder and the upper portions of the walls of the cylinder and the wall of said head are provided with connected chambers 12, through which a fluid cooling medium may be circulated for the convection of heat. A portion of the upper wall of the head 11 is formed on an angle of approximately 45° and formed in the center of this inclined portion of the head is a depression 13, in which is seated a spark plug 14, the electrodes of which project into the combustion chamber 15.

Suitable cooling fluid flow connections 16 are made to the upper and lower portions of the chambers 12.

Arranged for reciprocatory movement within the cylinder 10 is a piston 17 that is connected in the conventional manner to the upper end of a connecting rod 18 and the lower end of the latter is connected to the crank throw of a crank shaft (not shown).

Formed integral with and projecting rearwardly from the head 11 is a valve block 19 in which is formed a pair of tapered valve chambers 20. One of these valve chambers is provided with a gaseous fuel inlet port 21 and leading from the other valve chamber is an exhaust port 22.

Leading from the valve chamber having the inlet port 21 to the combustion chamber 15, is an inlet port 23 and an exhaust port 24 connects the combustion chamber 15 with the valve chamber having the exhaust port 22.

The upper ends of the valve chambers 20 are closed by a plate 25 that is detachably secured in any suitable manner to the top of head 11 and the upper end of block 19 and formed in the underside of this plate is a recess 26, in which is seated a wire screen 27 of fine mesh and which overlies the upper end of the valve chambers 20, thereby providing a screen for filtering the oil that is pumped into the upper portions of the valve chambers.

Leading from the oil sump in the lower portion of the crank case 28 to a suitably located oil pump 29, is an oil circulation pipe 30 and from the opposite side of the oil pump an oil circulation pipe 31 leads to an inlet opening 32 that is formed in the center of plate 25.

Formed through the center of the valve block 19 and between the chambers 20, is a vertically disposed oil duct 33, and the upper end of this duct communicates with a short transversely disposed duct 34 that is formed in the top of block 19 and the ends of which last mentioned duct communicate with the valve chambers 20.

Arranged for oscillation within the chamber 20, that is provided with the inlet ports 21 and 23, is a gaseous fuel inlet valve 35 and a corresponding valve 36, which functions as an exhaust valve, is arranged for oscillatory movement in the valve chamber having the exhaust ports 22 and 24.

The valves 35 and 36 are identical in construction and the body of each valve is tapered longitudinally so as to fit the correspondingly tapered valve chambers 20 and the upper ends of both valves are recessed to form oil pockets 37.

When properly seated, the upper ends of the valves 35 and 36 are positioned a short distance below the screen 27 that covers the upper ends of the valve chambers.

Valve 35 is provided with a diametrically arranged port 38 that is adapted to register with the inlet ports 21 and 23 and valve 36 is provided with a similar port 39 that is adapted to register with exhaust ports 22 and 24.

Formed integral with the lower portion of each valve and depending therefrom, is a short cylindrical stem 40, in which is formed an axial bore 41, that extends a short distance upwardly in the body of the valve and extending horizontally through the shank 40 is an aperture 42, that intersects the bore 41 and which is arranged to one side of the axis of said bore.

Formed on the outer face of the stem 40, around one end of the aperture 42, is a flat face 43.

Formed through the lower portion of each valve body and leading downwardly from the upper end of the bore 41 to the underface of the valve body adjacent to the surface of the stem 40, is a duct 44, which permits air to escape from the upper end of the bore 41 when the upper end of the valve stem is inserted therein.

Each valve is equipped with a stem 45, the upper end thereof being adapted to fit snugly within the bore 41 and formed in one side of the inserted portion of the stem is a notch or recess having a flat bottom face 46.

A pin 47, having one side cut away to form a flat face 48 that is inclined longitudinally, thereby providing a wedge key that serves to lock the valve stem to the lower end of the valve and when the key is inserted through the aperture 42 and is driven thereinto, the flat face 48 on said key engages the flat face 46 of the notch in the valve stem, thereby very securely locking the stem to the valve and providing for the ready adjustment of the valve on the stem.

The outer end of the pin or key 47 is threaded as designated by 49 and which threaded end portion projects outwardly from the flat face 43. To withdraw the pin or key, it is only necessary to apply a suitable tool having an integrally threaded recess for the reception of the threaded end of the pin 49 and after said tool is screwed unto the pin, the bearing of the end of the tool against the flat face 43, will withdraw the pin or key 47 so that the valve may be adjusted upon its stem or detached therefrom (see Figs. 5 and 6).

In Fig. 7, I have shown a modified form of the valve and in this construction the port, instead of extending diametrically through the valve body, leads from the top thereof downwardly and thence laterally to the side of the valve body.

Where a valve of this construction is employed, it is necessary to arrange the external inlet and outlet ports in the head or plate that covers the valve chambers.

Extending rearwardly from the side of the cylinder block 10, are side walls 50 and removably secured thereto is a rear wall or plate 51.

Formed integral with and projecting rearwardly from the cylinder block between the lower portions of the side walls 50 is a block 52 that serves as a bearing for the lower ends of the valve stems 45 and a support for the valve stem oscillating mechanism, which will now be described and which is illustrated in detail in Figs. 8 and 9.

The lower portion of each valve stem 45, provided with an integral collar 53 that rests on the inner race of an anti-friction bearing 54, the latter being positioned in a recess in the block 52 and retained in such position by a removable plate 55.

The hub 56 of a short arm 57 is secured by means of a key 58 to the lower end of each valve stem 45 and to further secure this arm and hub to the valve stem, a screw 59 is seated in a threaded recess in the lower end of the stem and the head 60 of which screw occupies a recess in the underside of hub 56.

Seated in block 52, adjacent to the lower end of each valve stem, is a pin 61 that is detachably retained in its position by a set screw 62 and the lower portion of this pin projects below block 52 to form a trunnion 63.

Journaled on each trunnion is the hub portion of a lever 64, which extends beneath arm 57 and formed in the free end of the arm is a short longitudinally disposed slot 65, into which projects a pin 66 that is seated in and depends from the free end of the short arm 57.

The end of arm 64 is retained on trunnion 63 by the head of a screw 67 that is seated in the trunnion and in order to hold the screws against rotation after being set, the arms of a locking member 68 occupy the slots in the heads of the screws 67 and said locking member being secured to the underface of block 52 at a point between the trunnions 63 by a screw 69.

Depending from the intermediate portion of each arm 64 is a short trunnion 70, on which is journaled a roller 71 and said roller being retained in position by the head of a screw 72, the threaded shank of which passes through the trunnion 70 and the arm 64 and said screw being locked to the arm by a cotter pin 73.

The rollers 71 are positioned in the irregular grooves of cams 74 and which latter are secured on a cam shaft 75 that is driven in the conventional manner and at the proper speed from the crank shaft of the engine.

During the operation of my improved engine the cams 74 engage rollers 71, thereby imparting swinging movement to the arms 64, which latter are fulcrumed on the trunnions 63 and as a result of the engagement of the pins 66 in slots 65, the short arms 57 that are secured to the lower ends of the valve stems are vibrated.

Figure 9:
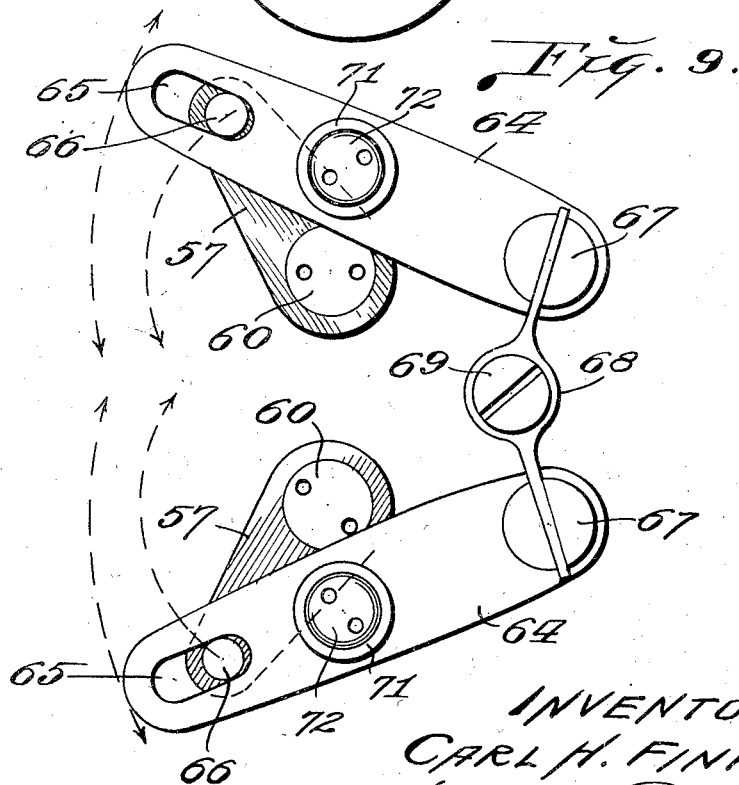
Fig. 9 is a view looking against the underside of the valve oscillating mechanism.

Owing to the different lengths of the radii of movement of the arms 64 and 57 and which radii are shown by dotted lines in Fig. 9, the short arms 57 that are secured to the valve stems have a much greater arcs of travel than said arm 64.

As a result of the movement imparted to valve stems 45, the valves 35 and 36 are oscillated in their bearings so as to move their ports into and out of engagement with the inlet and outlet ports leading to and from the combustion chamber in the engine cylinder.

During the suction stroke of the piston, port 38 in valve 35 is in registration with inlet ports 21 and 23, thereby admitting a gaseous fuel charge into the combustion chamber and during this time port 39 in valve 36 is out of registration with the exhaust ports 22 and 24.

During the succeeding upward or compression stroke of the piston, both inlet and exhaust valves are closed or positioned so that their ports are out of registration with the inlet and exhaust ports and thus the charge of gaseous fuel drawn into the combustion is compressed in the upper portion thereof and at top center or immediately thereafter the compressed charge is ignited by a spark produced between the electrodes of spark plug 14 and the expansion following combustion forces the piston down on its power stroke.

On the succeeding upward or exhaust stroke of the piston, valve 36 is oscillated so that its port 39 registers with the ports 22 and 24 and thus the products of combustion are forced out through the registering ports 24, 39 and 22.

At the time the compressed gaseous fuel charge is ignited and high pressure and expansion are developed, both inlet and exhaust valves are stationary and said valves are to a certain extent cushioned by the films of oil between the surfaces of said valves and the surrounding walls. As a result of this arrangement, there is very little, if any, wear or distortion of the valves as a result of the high pressures that are imparted to the surfaces of said valves at the time of ignition of the gaseous fuel charges.

During operation of the engine, the oil pump 29 operates to draw oil from the sump in the lower portion of the crank case and deliver this oil through pipe 31 and such oil is discharged through port 32 and after being strained in its passage through screen 27, this oil discharged through duct 34 into the valve chambers 20 and the pockets 37 in the upper ends of the valves 35 and 36. This constant circulation of oil through the pockets 37 and through the upper portions of the valve chambers 20 serves to dissipate the heat from the valves, thereby cooling the same and in addition to lubricating the valves and their seats, said oil functions to seal the joints between said valves and the walls of the valve chamber. The oil, after circulating through the chambers above the valves and in the pockets in the tops of said valves, discharges downwardly through duct 33 and passes into the sump in the lower portion of the crank case.

It will be noted that the duct 33 passes downwardly in the wall of the cylinder block and head directly between the valve chambers 20 and a considerable portion of the oil that discharges from the lower end of said duct will flow downwardly over the water cooled cylinder wall and thus said oil will be materially cooled before it reaches the valve oscillating means that is mounted upon and below block 52. Practically all of the oil that discharges from the duct 33 and being appreciably cooled by its flow over the water cooled cylinder wall, will flow over the valve oscillating means mounted upon and below the block 52, thereby lubricating the same and said oil will pass from said oscillating means into the sump in the crank case.

By removing plate 51, the valves are readily accessible for the purpose of inspection and adjustment and when it becomes necessary to adjust the valves to their seats to take up any wear or lost motion, the locking pins 47 may be readily withdrawn by applying a suitable tool to the threaded ends of said locking pins and manipulating such tool so as to effect withdrawal of said pins.

Thus it will be seen that I have provided a relatively simple, practical and efficient internal combustion engine, having oscillating valves and which valves are readily accessible and removable so as to facilitate adjustment and said engine being provided with relatively simple and efficient means for cooling, lubricating and sealing the oscillating valves and likewise with simple means for imparting the desired oscillatory movement to said valves.

While I have shown and described the engine head as being formed integral with the upper end of the cylinder, it will be understood that said head may be separately formed and secured to the cylinder block in the conventional manner. Further, I have shown and described a one-cylinder engine, but obviously my invention comprehends a multi-cylinder engine.

By providing the cylinder head with an inclined portion and arranging said inclined portion on the opposite side of the axis of the cylinder from the inlet port 23, the gaseous fuel charge that enters the inlet port strikes against the inside face of the inclined portion of the head and the column of gaseous fuel is thereby given a whirling motion so as to produce the desired turbulence of the gaseous fuel charge which insures thorough mixture of the gaseous fuel charge, air and any heated products of combustion that might remain within the combustion chamber after the closing of the exhaust valve and as a result of this thorough mixture a more uniform flame propagation through the compressed fuel charge is attained at the time the compressed charge is ignited.

It will be understood that minor changes in the size, form and construction of the various parts of my improved internal combustion engine may be made and substituted for those herein shown and described without departing from the spirit of my invention, the scope of which is set forth in the appended claims.

I claim as my invention:

1. In an internal combustion engine, a cylinder, a head formed integral therewith, a block formed integral with the rear portion of said head a pair of vertically disposed valve chambers formed in said block an oil circulation duct formed through said block between the valve chambers therein and the upper end of which duct has communication with both valve chambers.

2. In an internal combustion engine, a cylinder, a head therefor, a block to the rear of said head, which block is provided with a pair of vertically disposed valve chambers, ports between said valve chambers and the combustion chamber in the engine cylinder, valves arranged for oscillation within said valve chambers, which valves are provided with ports that are adapted to register with the ports between the valve chambers and combustion chamber, means for imparting oscillatory motion to said valves means for delivering liquid lubricant to the upper portions of said valve chambers a liquid lubricant duct formed through said block between the valve chambers therein and the upper end of which duct has communication with the upper ends of both valve chambers.

3. In an internal combustion engine, a cylinder, a head therefor, a block arranged to the rear of said head, which block is provided with valve chambers, valves arranged for oscillatory movement within said valve chambers, a plate applied to the top of said block and closing the upper ends of said valve chambers, a screen arranged on the underside of said plate and covering the upper ends of the valve chambers and a liquid lubricant supply pipe connected to said plate.

4. In an internal combustion engine, a cylinder, a head therefor, a block arranged to the rear of said head, which block is provided with valve chambers, valves arranged for oscillatory movement within said valve chambers, a plate applied to the top of said block and closing the upper ends of said valve chambers, a screen arranged on the underside of said plate and covering the upper ends of the valve chambers, a liquid lubricant supply pipe connected to said plate and liquid lubricant overflow ducts leading from the upper portions of said valve chambers downwardly through said block.

5. In an internal combustion engine, oscillating valves for controlling the inlet of gaseous fuel into the combustion chamber of the engine and for controlling the exhaust of products of combustion from said combustion chamber means for circulating liquid lubricant while under pressure over and in direct contact with said oscillating valves for cooling and lubricating the same and means for conducting the liquid lubricant after passing over the oscillating valves to a water cooled portion of the engine.

6. In an internal combustion engine having oscillating valves for controlling the inlet of gaseous fuel into the combustion chamber of the engine and for controlling the exhaust of products of combustion from said combustion chamber, the use of oil or liquid lubricant under pressure and in constant circulation over and in direct contact with said oscillating valves for cooling the same and means for causing the liquid lubricant to flow over a water cooled portion of the engine as it has passed over said valves.

7. In an internal combustion engine, a cylinder having a water jacket, chambers for oscillatory valves within the engine block for controlling the admission of gaseous fuel into the combustion chamber within said cylinder and the exhaust of products of combustion from said combustion chamber, means for oscillating said valves, means for effecting a constant flow of liquid lubricant under pressure over said valves and said oscillating means and through the engine block between the chambers for said valves and which liquid lubricant in its travel flows by gravity over a portion of the surface of the water jacket of said cylinder.

CARL H. FINK.